United States Patent [19]

Brune

[11] 4,262,740
[45] Apr. 21, 1981

[54] CASINGS FOR HEAT EXCHANGERS AND BURNER/RECUPERATOR ASSEMBLIES INCORPORATING SUCH CASINGS

[76] Inventor: Heinz Brune, P.O. Box 3201, Sta. C., Hamilton, Ontario, Canada, L8H 7K6

[21] Appl. No.: 10,186

[22] Filed: Feb. 7, 1979

[51] Int. Cl.³ .............................................. F28F 9/00
[52] U.S. Cl. ...................................... 165/67; 165/69; 165/76; 165/82; 165/165
[58] Field of Search ...................... 165/9.3, 9.4, 67, 69, 165/76, 82, 83, 165

[56] References Cited

U.S. PATENT DOCUMENTS

| 3,121,559 | 2/1964 | Tippmann | 165/83 |
| 3,315,739 | 4/1967 | Kearney | 165/165 |
| 3,775,972 | 12/1973 | Perpall | 165/69 |
| 3,986,549 | 10/1976 | Huggins et al. | 165/82 |
| 4,139,054 | 2/1979 | Anderson | 165/83 |

FOREIGN PATENT DOCUMENTS

1240897  5/1967  Fed. Rep. of Germany ........... 165/165

*Primary Examiner*—Sheldon J. Richter

[57] ABSTRACT

The invention provides a protective casing for a cube-shaped modular ceramic heat exchanger core, in which the core can easily be installed without danger of leakage between the fluid paths of the core, either while the device is new as its temperature changes, and subsequently as it is in use subjected to drastically altering operating temperature. Moreover, the core can easily be replaced by a core of different heat transfer ability without diminishing the ability to prevent such leakage. To this end the core rests in the casing with the edges of one face engaged with a suitable ceramic fibre composition gasket; the opposite face of the same flow path as engaged by another such gasket and the gasket is in turn engaged by a gasket compression member. The compression member is urged into this engagement by strong springs which thereby hold the gaskets in the necessary sealing engagement. Preferably the body of the protective casing is of refractory material, and may be enclosed by a supplementary outer metal casing. The exchanger may be used as a heat reclaimer receiving through one path the outlet flue gas of a high temperature furnace, and through the other path the combustion air for the furnace hot air burner. Preferably the gasket compression member is located at the inlet for the combustion air, which is the coolest location. The invention also permits the production of an integral burner/recuperator assembly without the need for heavily insulated connections as in the prior art.

7 Claims, 5 Drawing Figures

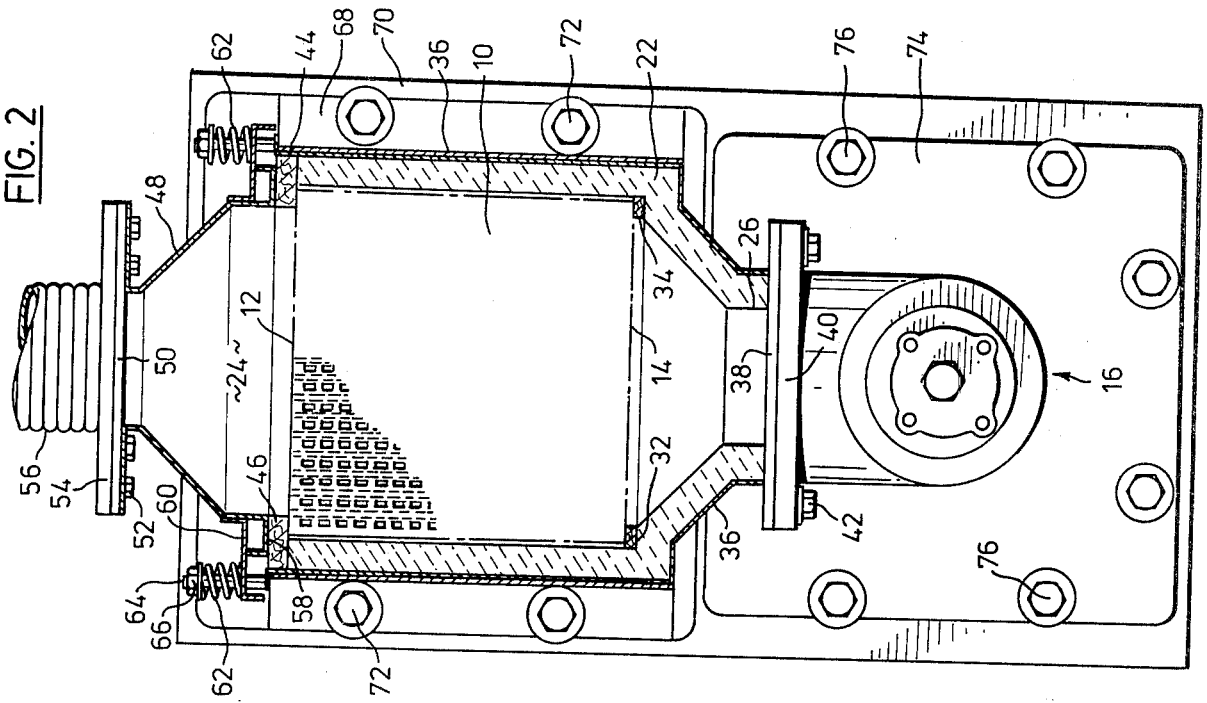
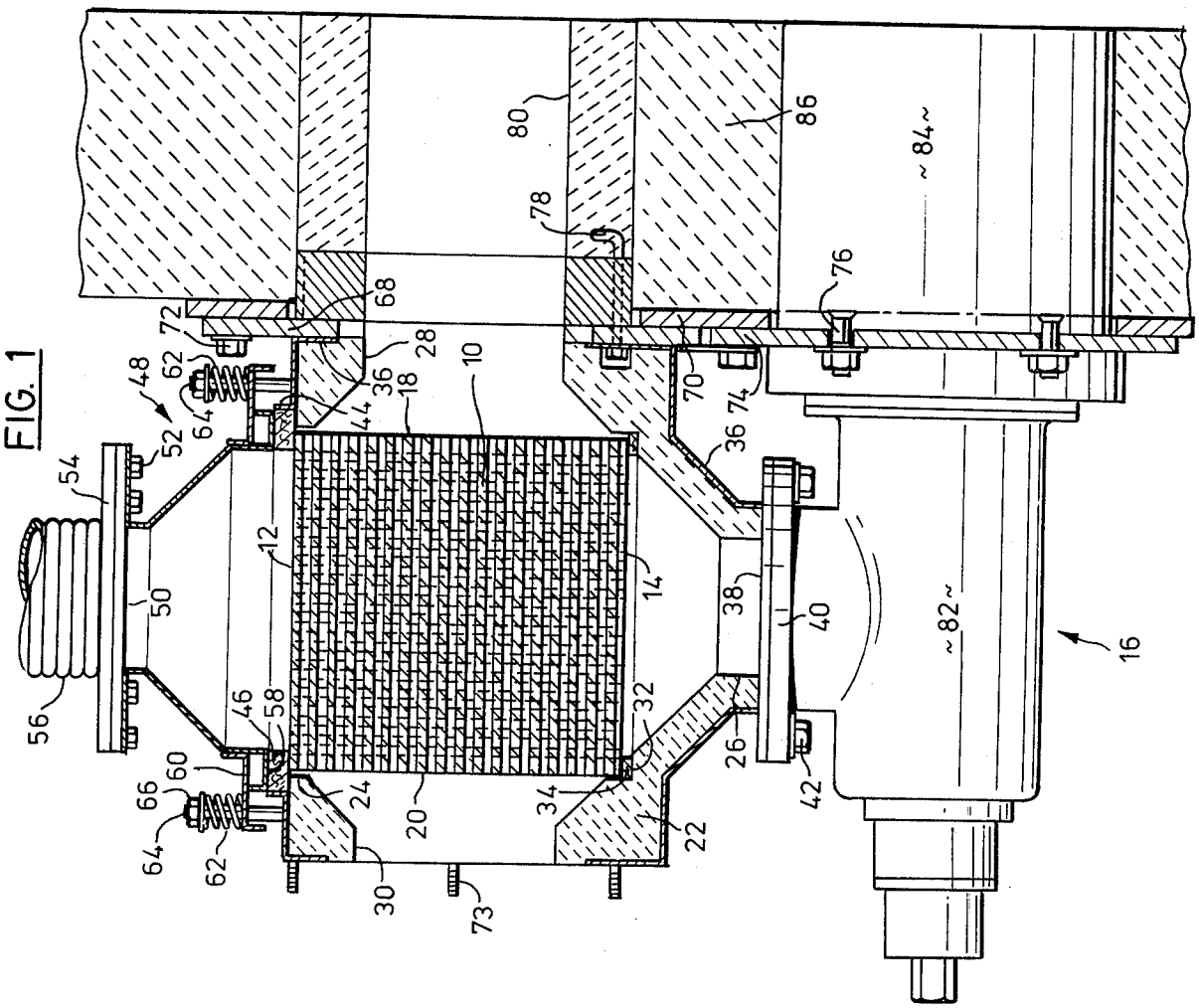

CASINGS FOR HEAT EXCHANGERS AND BURNER/RECUPERATOR ASSEMBLIES INCORPORATING SUCH CASINGS

FIELD OF THE INVENTION

The present invention is concerned with improvements in or relating to casings for heat exchangers, and in or relating to burner/recuperator assemblies incorporating such casings, and especially to such casings and assemblies enclosing a ceramic heat exchanger core of unitary structure.

REVIEW OF THE PRIOR ART

A comparatively recent development in the heat exchanger field is the economical production of unitary heat exchanger cores made of ceramic material able to withstand relatively high temperatures, e.g. of the order of 1400° C. The resulting heat exchangers are particularly suitable for use, for example, as heat recuperators or reclaimers for high temperature production furnaces, in which heat from the hot furnace flue gas in one flow path is transferred to the furnace burner combustion air in another flow path to improve combustion and overall fuel efficiency. The core must be enclosed in a casing which provides the necessary fluid inlets and outlets for the paths, and in the prior art structures of which I am aware considerable difficulty has been experienced in sealing the core into the casing in a manner that will avoid leakage of fluid between the flow paths and consequent loss of efficiency. Even if the sealing is effective when the device is new, it is found that in use leakage begins relatively quickly as it is subjected to the drastically changing temperatures encountered in service. The problem is compounded by the difficulty of finding suitable construction materials with sufficiently close coefficients of expansion to avoid the large changes in dimension that result from these drastic changes in temperature.

DEFINITION OF THE INVENTION

It is therefore an object of the invention to provide a new casing for heat exchanger cores with improved sealing between the casing and the core, so that the possibility of fluid leakage between the fluid paths through the core is considerably reduced even after operation of the device for a considerable period of time under drastically changing service temperatures.

It is another object to provide such a casing permitting ready replacement of the core without reduction of the efficiency of the sealing between the casing and its core.

It is a further object to provide such a casing permitting the production of an integral burner/recuperator assembly.

In accordance with the present invention from a first aspect there is provided a casing for a heat exchanger core which has therein a first plurality of parallel passages extending between two opposite faces of the body and constituting a first fluid flow path having an inlet and an outlet and a second plurality of parallel passages extending between two other opposite faces of the body and constituting a second fluid flow path having an inlet and an outlet and in heat exchange communication with the first path, the casing including:

a hollow casing body having an internal shoulder to be engaged by a respective face of the core and surrounding a respective fluid path inlet or outlet from the casing body, a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges; and resilient means operative between the gasket compressor member and the casing body to urge the compressor member toward the core face and thereby compress the gaskets into sealing engagement with the respective core edges and the casing body.

Also in accordance with the invention from another aspect there is provided a casing for a heat exchanger core of rectangular parallelepiped shape and having therein two fluid flow paths in heat exchange communication with one another and extending at right angles to one another, the casing including:

a hollow casing body having an internal shoulder to be engaged by a respective face of the core and surrounding a respective fluid path inlet or outlet from the casing body; and having a gasket interposed between the shoulder and the edges of the abutting core face;

the casing body having an opening through which the core is inserted into and removed from the body interior;

a second gasket closing a gap between the core edges and the said opening to seal the gap; and a removable gasket compressor member compressing the gaskets into sealing engagement with the core and the casing body and removable for removal of the core from the body interior.

Also in accordance with the invention from a further aspect there is provided a burner/recuperator assembly comprising:

a heat exchanger core having two fluid flow paths at right angles to one another and in heat exchange relationship to one another;

a recuperator casing enclosing the said core and providing an inlet and an outlet for each of the said two paths;

and a burner mounted to the recuperator casing with its air inlet fed directly from a fluid path outlet for air heated by its passage through the heat exchanger core.

DESCRIPTION OF THE DRAWINGS

Heat exchange casings and furnace burner recuperator assemblies which are particular preferred embodiments of the invention will now be described, by way of example, with reference to the accompanying diagrammatic drawings wherein:

FIG. 1 is a view partly in transverse cross-section and partly in side elevation of a first embodiment comprising a furnace burner/recuperator assembly and showing the assembly mounted in a furnace wall;

FIG. 2 is a view in transverse cross-section and end elevation of the embodiment of FIG. 1, the furnace wall being omitted;

DESCRIPTION OF THE PREFERRED EMBODIMENTS

Figure 3:
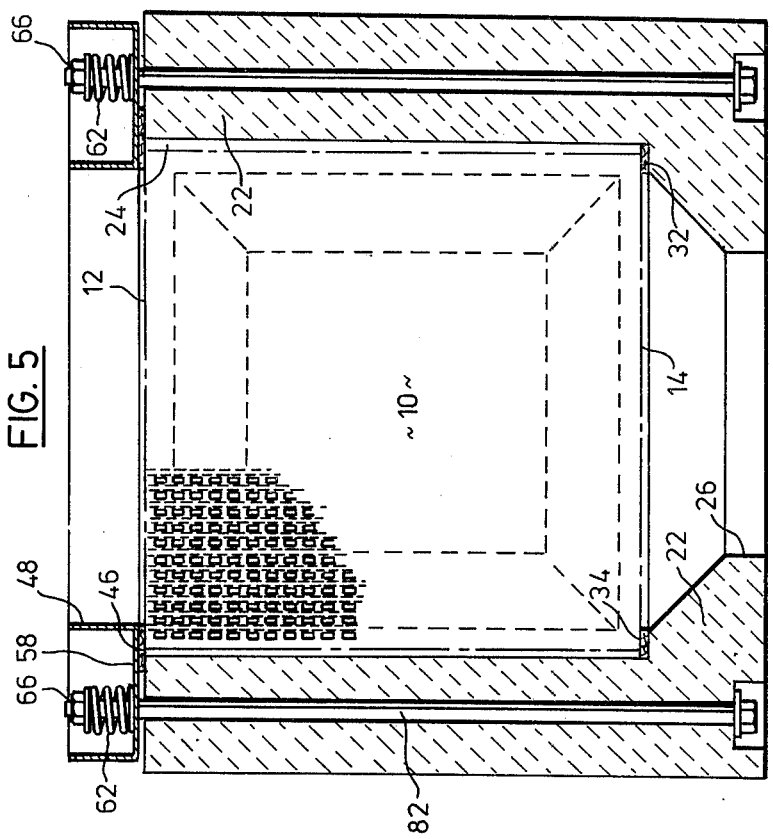
FIG. 3 is a top plan view of part of a second embodiment consisting of a heat exchanger adapted to be stacked with a plurality of similar units.

The casings of the invention are employed with a heat exchanger core 10 which is of rectangular parallelepiped shape, more particularly of cubical shape, of ceramic material, so that it is readily able to withstand fluid temperatures of up to 1400° C., such as are encountered with the flow gases of a high temperature production furnace. The core provides a first flow path constituted by a respective plurality of parallel passages extending from an inlet face 12 to an outlet face 14, the path being intended for the passage of combustion air for a furnace hot air burner 16. The core also provides a second flow path constituted by a respective plurality of parallel passages extending at right angles to the first path passages and in heat exchange relation thereto, this second path extending from an inlet face 18 to an outlet face 20. The second path receives hot flue gases from the furnace chamber fed by the burner 16. Such a unitary ceramic core is sold for example by GTE Sylvania.

Referring now specifically to FIGS. 1 and 2, illustrating a burner/recuperator assembly, the casing for this embodiment consists of a hollow refractory body 22 surrounding the core 10 and having inlet 24 and outlet 26 for the first path, and inlet 28 and outlet 30 for the second path. The first path inlet 24 is the only one big enough for the core to pass through, and this is therefore the only opening by which the core can be inserted in the casing. The body 22 provides around the edges of the core face 14, between that face and the outlet 26 of a square circumference shoulder 32 on which rests a square-circumference first gasket 34 of a suitable high temperature ceramic fibre composition. The gasket 34 receives the edges of the face 14 and seals the first flow path outlet against leakage of fluid into the other path and consequent loss of efficiency and control of fluid flow. In this embodiment the body 22 is surrounded by a metal casing 36 providing a flange 38 to which a flange 40 of the burner 16 is connected by bolts 42. The casing provides an upstanding square circumference perimeter wall 44 surrounding the inlet 24 and receiving a square-shaped gasket 46 that extends around the edges of the core face 12 to seal the first flow path inlet against leakage. The casing 36 is completed by a separate removable portion 48 having a flange 50 to which is connected by bolts 52 flange 54 of a flexible air inlet conduit 56. This casing portion 48 in this embodiment also constitutes a gasket compressor member, and the face of the gasket 46 opposite to that engaged by the edges of the core face 12 is engaged by a square circumference face of the member 58. In this embodiment the casing parts 36 and 48 are of sheet metal and the face 58 is the bottom wall of a square-circumference channel so as to provide the necessary rigidity, the channel being formed by turning and returning the part of the member 48 adjacent the face 58. The channel is closed to further increase its rigidity by an outwardly extending member 60 that is stiffened by having its edges turned at right angles to the plane of the member. The resulting gasket compressor member is in this embodiment urged into engagement with the gasket 46 by resilient means constituted by four strong compression coil springs 62 mounted around studs 64 that are rigidly fastened to the casing part 36 and extend freely through holes in member 60. Other forms of resilient means, e.g. Belleville springs are apparent to those skilled in the art. The gaskets 32 and 36 are thereby constantly urged into sealing engagement with the edges of the core faces, despite any dimensional changes that can occur with change in temperature of the assembly, or with changes resulting from creep of the materials of the assembly with time. The conduit 56 is sufficiently flexible not to interfere with these arrangements.

The core is readily removed at any time very simply and easily by removing nuts 66 from the studs 64 and then removing springs 62. The member 48 can now be lifted off the studs and the core withdrawn through opening 24. It will be seen therefore that at any time the core can be replaced by one of different characteristics, such as flow or heat transfer ability, and the new core sealed without difficulty into the casing and without the danger of subsequent leakage. Although in this embodiment the casing parts 36 and 48 are of sheet metal in other embodiments they could be other materials, such as cast iron.

The gasket compressor member is located at the inlet for incoming air so that it is at the coolest part of the assembly and will be least affected by temperature changes. The casing 36 is provided with a flange 68 by which it is fastened to a common mounting plate 70, as by bolts 72, and with studs 73 by which the recuperator can be connected to a floe leading the cooled gases to atmosphere. The burner 16 is provided with a respective flange 74 by which it also is fastened to the plate 70, as by bolts 76. The flange 68 also serves as a base member receiving fasteners 78 by which a refractory flue tile 80 is secured to the recuperator to receive hot flue gas from the furnace working chamber. The burner 16 consists of a body 82 and burner block or tile 84, and the two tiles 80 and 84 are of about the same length as the thickness of a furnace wall 86 in which they are inserted. The burner and the recuperator thereby together form a compact unitary structure that accommodates the right-angled configuration of the cross flow passages of the ceramic core. This compact structure may be contrasted with the known prior arrangements in which the recuperator is mounted apart from the burner and the gases are conveyed through heavily insulated conduits, with the consequent problems of relatively high heat loss and expansion of materials.

Figure 4:
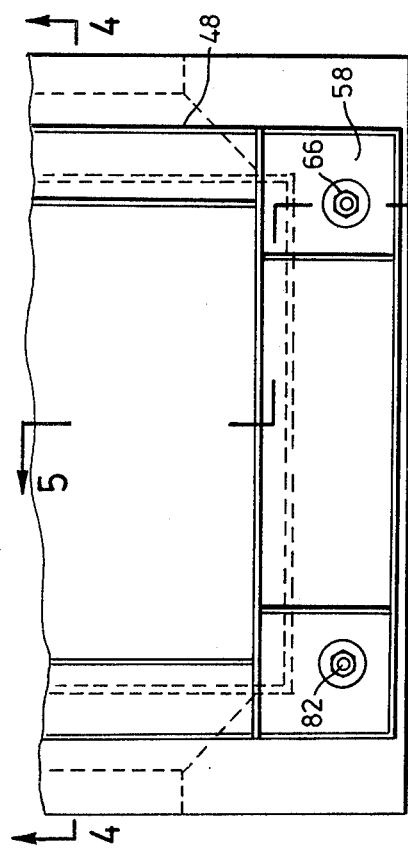
FIG. 4 is a transverse cross-section on the line 4—4 of FIG. 3.
Figure 5:
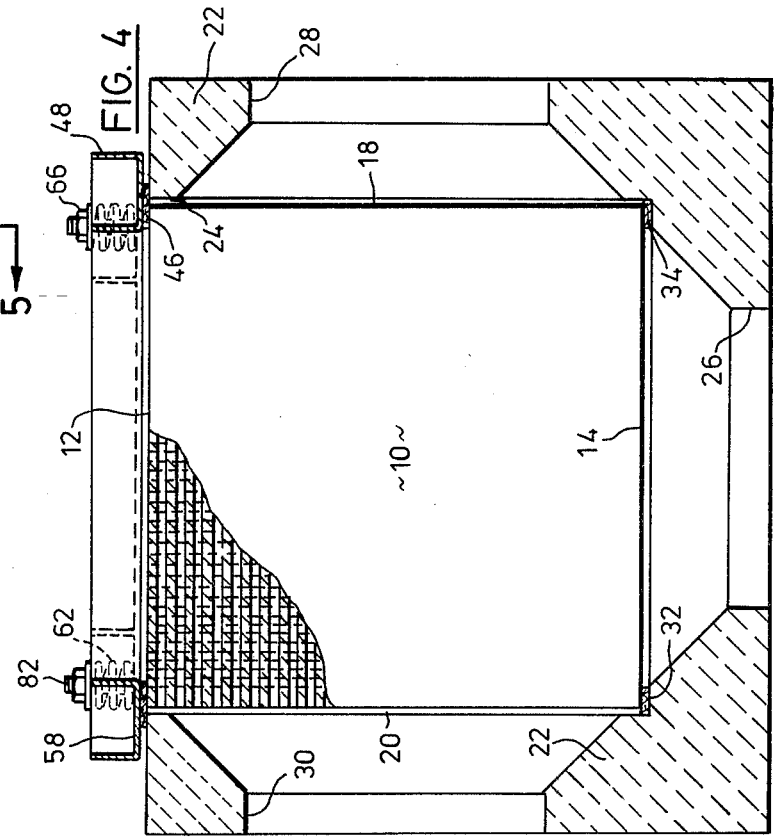
FIG. 5 is another transverse cross-section on the line 5—5 of FIG. 3.

Referring now to FIGS. 3 to 5, the embodiment illustrated therein has a body 22 of refractory material but no external metal casing, the devices being intended to be stacked so that their respective flow paths are in parallel or in series with one another, as may be required for the particular installation. Similar parts are given the same reference number as the embodiment of FIGS. 1 and 2. Since there is no external metal casing the studs are replaced by bolts 82 which extend completely through bores in the body 22 and have their heads accomodated by counterbores. Other embodiments of the invention will be apparent to those skilled in the art within the scope of the appended claims.

I claim:

1. A casing for a heat exchanger core which has therein a first plurality of parallel passages extending between two opposite faces of the body and constituting a first fluid flow path having an inlet and an outlet and a second plurality of parallel passages extending between two other opposite faces of the body and constituting a second fluid flow path having an inlet and an outlet and in heat exchange communication with the first path, the casing including:

a hollow casing body having an internal shoulder to be engaged by a respective face of the core and surrounding a respective fluid path inlet or outlet from the casing body;

a first gasket interposed between the shoulder and the edges of the abutting core face;

a second gasket mounted on the edges of the core face opposite to the said abutting face to seal the join between the said core edges and the casing body;

a gasket compressor member engaging the gasket face of the second gasket opposite to that engaged with the core face edges; and resilient means operative between the gasket compressor member and the casing body to urge the compressor member toward the core face and thereby compress the gaskets into sealing engagement with the respective core edges and the casing body.

2. A casing as claimed in claim 1, wherein the said core is of rectangular parallelepiped shape and said first and second gaskets are of rectangular circumferential shape.

3. A casing as claimed in claim 1, wherein the casing body is of refractory material adapted to be stacked side by side with at least one outlet of the body registering with the inlet of an adjacent casing body.

4. A casing as claimed in claim 1, wherein the casing body is of refractory material enclosed in a metal exterior casing, the exterior casing providing a casing surface surrounding the second gasket.

5. A casing as claimed in claim 3, wherein the gasket compressor member is of closed channel transverse cross-section.

6. A casing as claimed in any one of claims 3 to 5 wherein the spring means consists of four parallel-operating springs, each disposed at one corner of the casing.

7. A casing as claimed in any one of claims 1 to 5, wherein the said gasket compressor member is mounted on the inlet side of the fluid path for the passage of cooling or combustion air.

* * * * *